(12) United States Patent
Yamada et al.

(10) Patent No.: US 12,549,051 B2
(45) Date of Patent: Feb. 10, 2026

(54) ROTARY ELECTRIC MACHINE

(71) Applicant: DENSO CORPORATION, Kariya (JP)

(72) Inventors: Tamon Yamada, Kariya (JP); Jun Morimoto, Kariya (JP); Tsuyoshi Tashima, Kariya (JP); Tomohiro Aoyama, Kariya (JP); Takeshi Wakana, Kariya (JP); Akihiro Utsumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 18/430,515

(22) Filed: Feb. 1, 2024

(65) Prior Publication Data

US 2024/0171029 A1   May 23, 2024

Related U.S. Application Data

(63) Continuation of application No. PCT/JP2022/029736, filed on Aug. 3, 2022.

(30) Foreign Application Priority Data

Aug. 6, 2021   (JP) ................. 2021-129608

(51) Int. Cl.
*H02K 3/50* (2006.01)
(52) U.S. Cl.
CPC ........... *H02K 3/50* (2013.01); *H02K 2203/06* (2013.01); *H02K 2203/09* (2013.01)
(58) Field of Classification Search
CPC ....................................................... H02K 3/50

USPC ........................................................... 310/71
See application file for complete search history.

(56) References Cited

U.S. PATENT DOCUMENTS

| | | | | |
|---|---|---|---|---|
| 6,091,174 A | * | 7/2000 | Genster | F04D 13/0606 310/58 |
| 6,750,574 B2 | * | 6/2004 | Okazaki | H02K 3/522 310/90 |
| 9,831,748 B2 | * | 11/2017 | Hayashi | H02K 3/50 |
| 10,910,924 B2 | * | 2/2021 | Kodama | H02K 3/04 |

(Continued)

FOREIGN PATENT DOCUMENTS

| | | |
|---|---|---|
| JP | 2006-210517 A | 8/2006 |
| JP | 2006-308618 A | 11/2006 |

(Continued)

*Primary Examiner* — Alexander Talpalatski
(74) *Attorney, Agent, or Firm* — Maschoff Brennan

(57) ABSTRACT

A rotary electric machine includes a bus bar holder provided on one side of a stator in an axial direction, and a plurality of bus bar terminals that electrically connect the stator and a control unit. A lead wire is drawn out to a bus bar terminal side in an axial direction from a lead-out portion located on the bus bar terminal side among a plurality of windings provided all around a circumferential direction of the stator and between a plurality of adjacent windings. The bus bar terminal includes a winding side terminal portion having at least one connection part and a board side terminal portion connected to a board. The bus bar terminals are gathered in a part in the circumferential direction. The lead wire is wired so as to extend from one of the lead-out portions scattered all around the circumferential direction to one of the connection parts.

8 Claims, 6 Drawing Sheets

(56) References Cited

U.S. PATENT DOCUMENTS

| | | | |
|---|---|---|---|
| 2009/0155101 A1* | 6/2009 | Fukasaku | F04C 23/008 |
| | | | 417/410.1 |
| 2012/0229005 A1* | 9/2012 | Tominaga | H02K 11/38 |
| | | | 310/68 B |
| 2019/0044406 A1* | 2/2019 | Yamamoto | H02K 5/10 |
| 2019/0273416 A1* | 9/2019 | Kizu | H02K 7/14 |
| 2019/0305631 A1 | 10/2019 | Sonoda et al. | |
| 2020/0014272 A1* | 1/2020 | Asahi | H02K 3/50 |
| 2020/0036255 A1 | 1/2020 | Shirai et al. | |
| 2022/0416615 A1 | 12/2022 | Ninomiya et al. | |

FOREIGN PATENT DOCUMENTS

| | | |
|---|---|---|
| JP | 2013-171725 A | 9/2013 |
| JP | 2017-229174 A | 12/2017 |
| JP | 2018-107957 A | 7/2018 |

\* cited by examiner

ROTARY ELECTRIC MACHINE

CROSS REFERENCE TO RELATED APPLICATIONS

This application is a continuation application of International Patent Application No. PCT/JP2022/029736 filed on Aug. 3, 2022, which designated the U.S. and based on and claims the benefits of priority of Japanese Patent Application No. 2021-129608 filed on Aug. 6, 2021. The entire disclosure of all of the above applications is incorporated herein by reference.

TECHNICAL FIELD

The present disclosure relates to a rotary electric machine.

BACKGROUND

A conventional bus bar terminal for a rotary electric machine is known.

SUMMARY

An object of the present disclosure is to provide a rotary electric machine in which a bus bar terminal can be shortened.

A rotary electric machine of the present disclosure includes a stator, a rotor provided to be rotatable relative to the stator, a control unit connected to the stator, a bus bar holder provided on one side in an axial direction with respect to the stator, and a plurality of bus bar terminals fixed to the bus bar holder. The bus bar terminal electrically connects the stator and the control unit.

BRIEF DESCRIPTION OF THE DRAWINGS

The above and other objects, features and advantages of the present disclosure will become more apparent from the following detailed description taken in conjunction with the accompanying drawings. In the drawings.

DETAILED DESCRIPTION

In an assumable example, a bus bar terminal for a rotary electric machine is known. The bus bar terminal includes a motor connection member that is electrically connected to the windings of the motor, and a terminal member that is made up of a separate member from the motor connection member and is electrically connected to an external terminal.

The motor connection member is formed continuously over substantially the entire circumference in a circumferential direction in accordance with a plurality of windings arranged so as to be aligned all around the circumferential direction. Therefore, there was a problem that a bus bar terminal became long and required a large amount of material.

An object of the present disclosure is to provide a rotary electric machine in which a bus bar terminal can be shortened.

A rotary electric machine of the present disclosure includes a stator, a rotor provided to be rotatable relative to the stator, a control unit connected to the stator, a bus bar holder provided on one side in an axial direction with respect to the stator, and a plurality of bus bar terminals fixed to the bus bar holder. The bus bar terminal electrically connects the stator and the control unit.

The stator has a plurality of windings provided all around a circumference direction. A lead wire is drawn out to the bus bar terminal side in an axial direction from a lead-out portion located on the bus bar terminal side among the windings and between a plurality of adjacent windings in the circumferential direction. The bus bar terminal includes a winding side terminal part having at least one connection part and a board side terminal part connected to a board of the control unit. A plurality of bus bar terminals are gathered in a part in the circumferential direction. The lead wire is wired so as to extend from one of the plurality of lead-out portions scattered all around the circumferential direction to one of the plurality of connection parts.

As a result, it is sufficient to provide the bus bar terminal only in a part of the circumferential direction, so the bus bar terminal can be made shorter than in the conventional configuration in which the bus bar terminal is continuously provided over substantially the entire circumferential direction. This configuration reduces the material costs of the bus bar terminal.

One Embodiment

Figure 1:
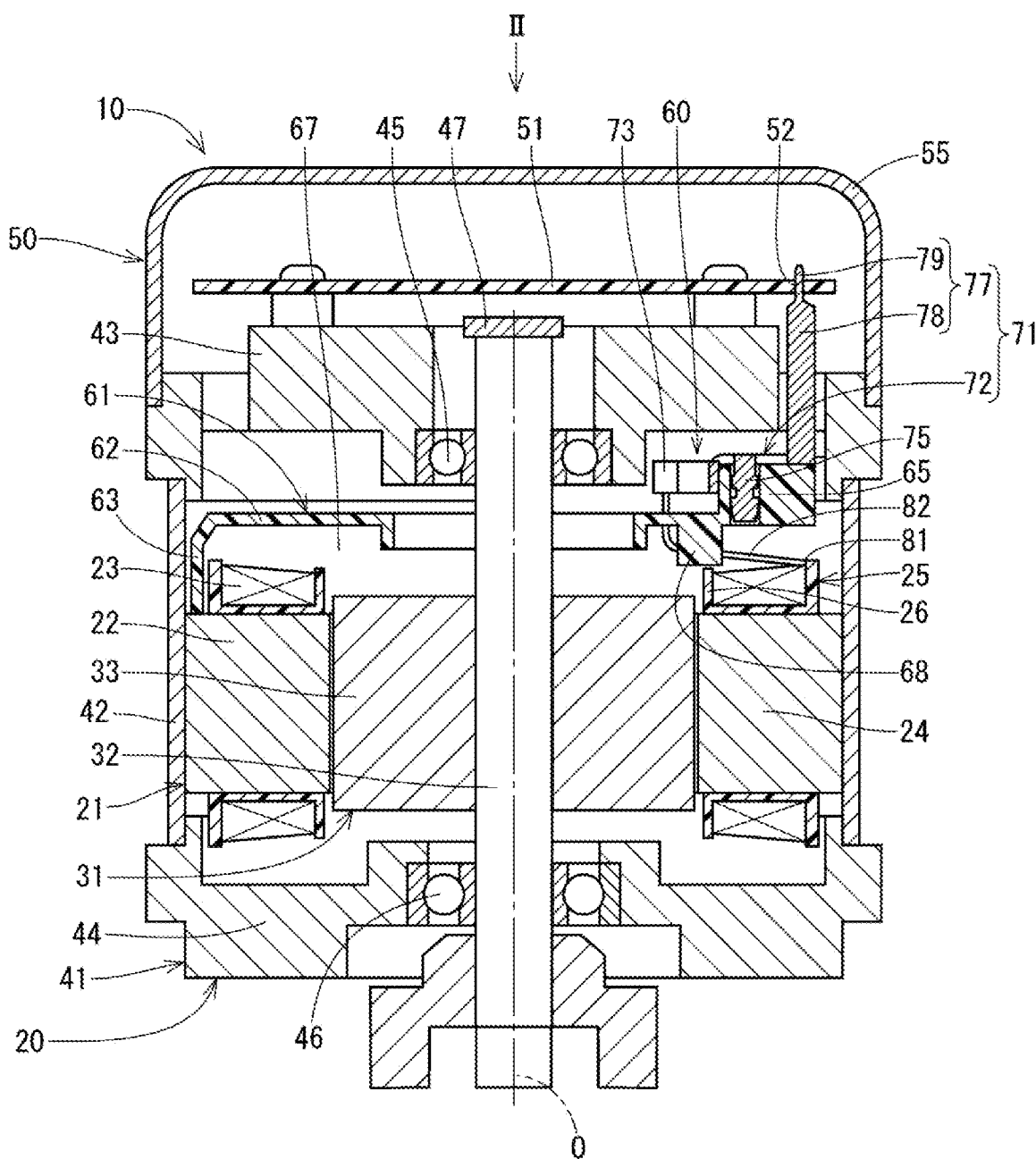
FIG. 1 is a longitudinal cross-sectional view of a rotary electric machine according to one embodiment.
Figure 2:
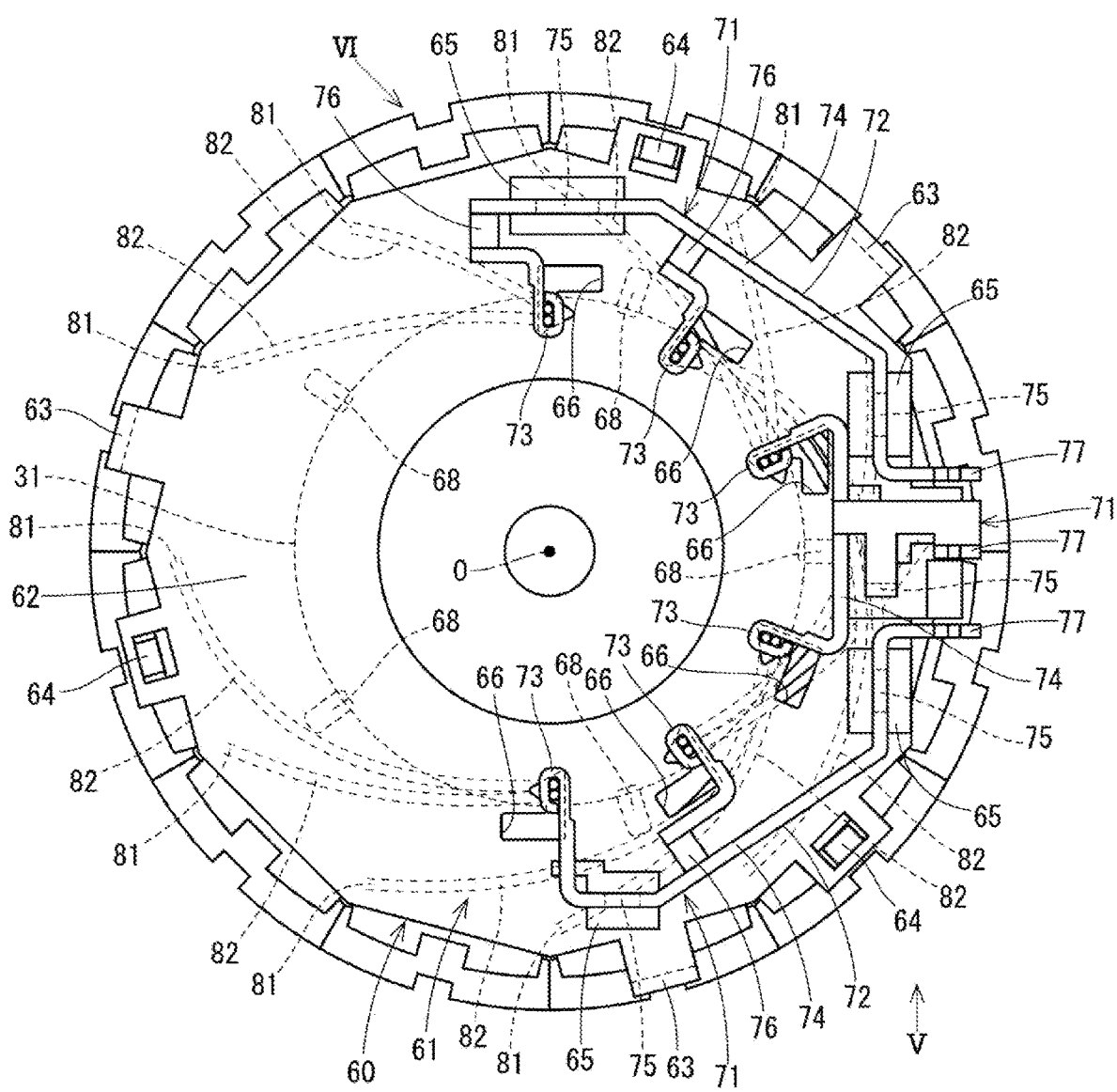
FIG. 2 is a diagram of a bus bar unit, a stator, and a rotor of FIG. 1, viewed from a direction of arrow II.
Figure 3:
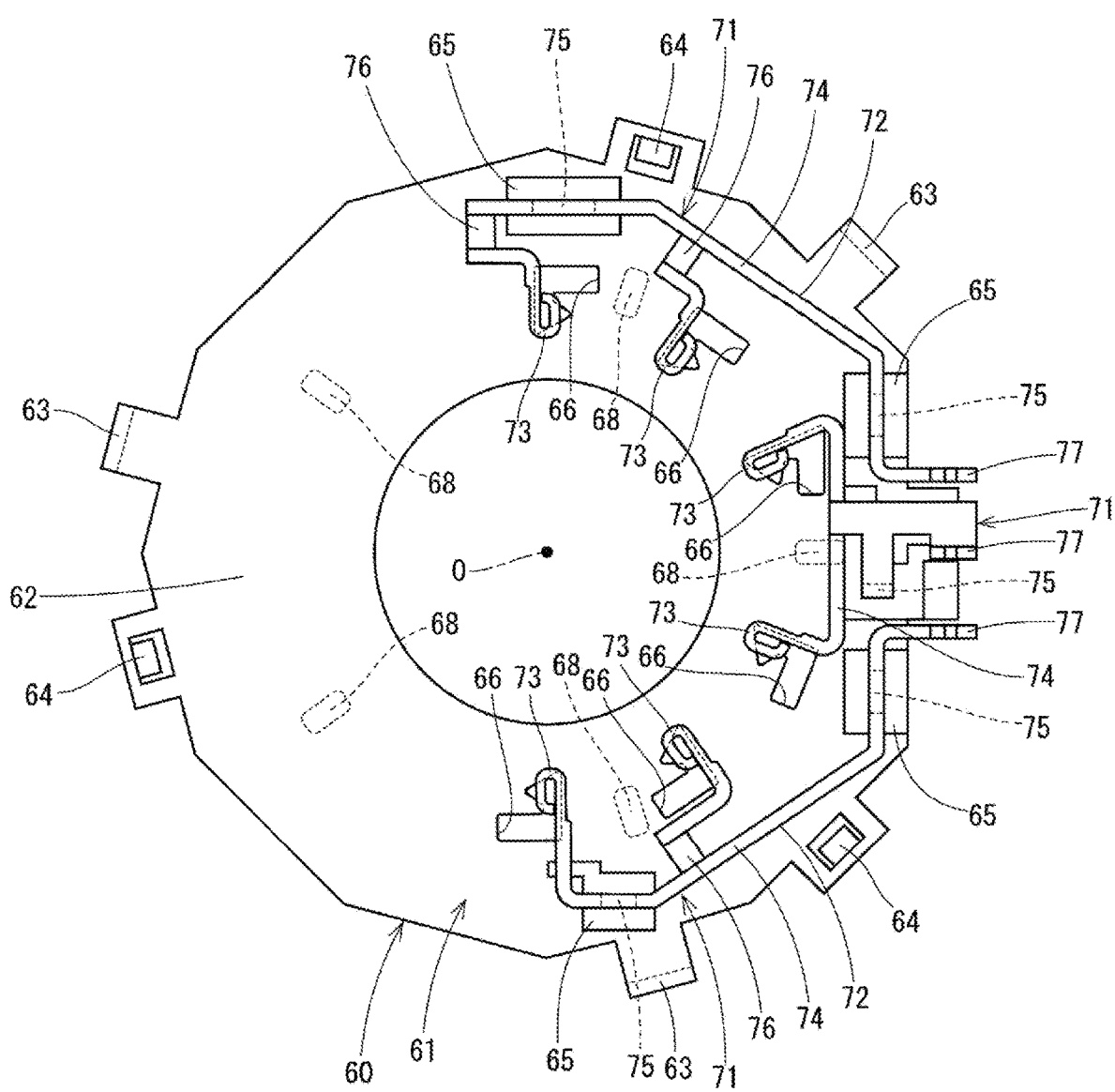
FIG. 3 is a diagram showing the bus bar unit of FIG. 2.
Figure 4:
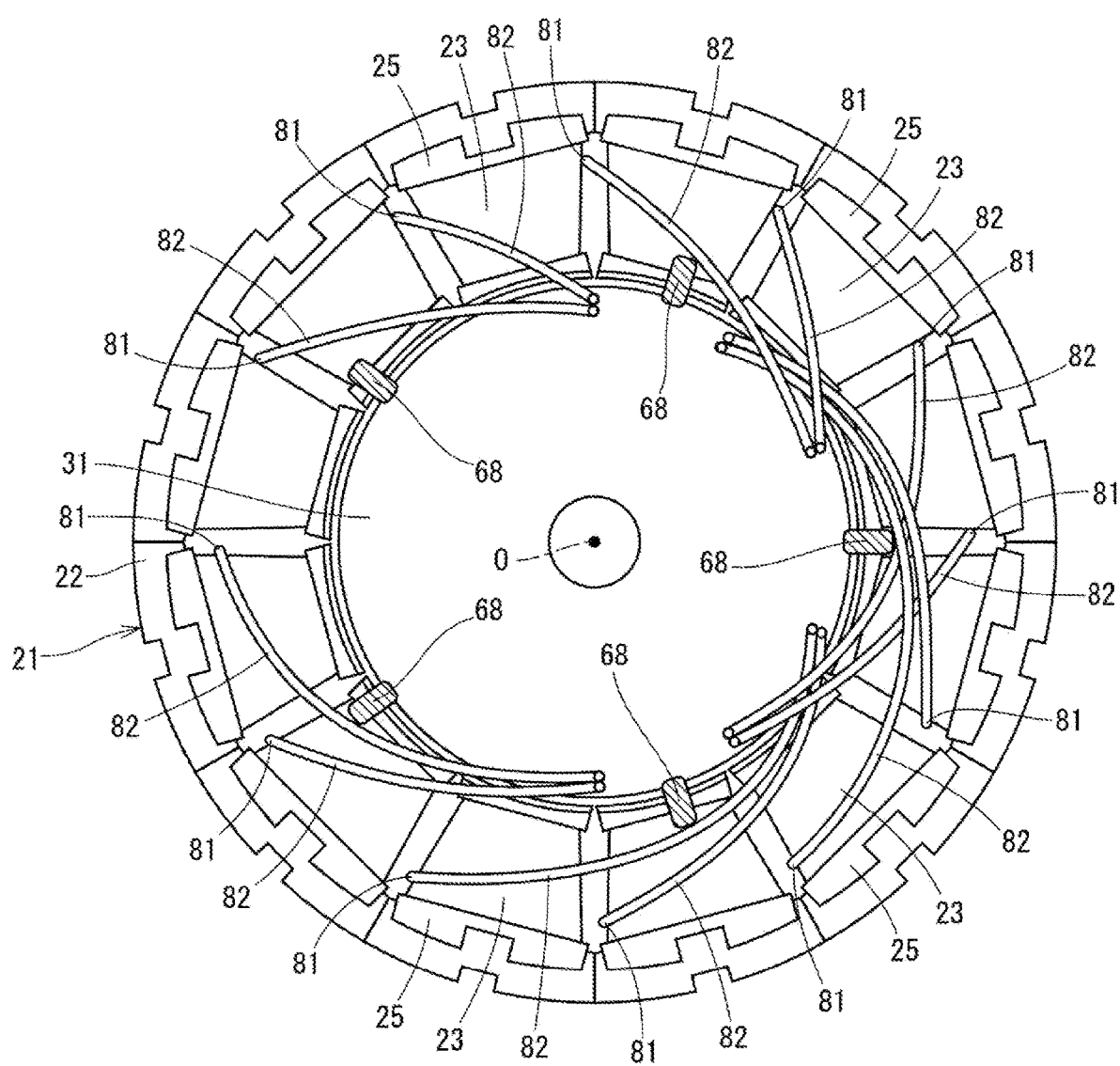
FIG. 4 is a cross-sectional view of the stator, the rotor, and protrusions of a bus bar holder in FIG. 2.
Figure 5:
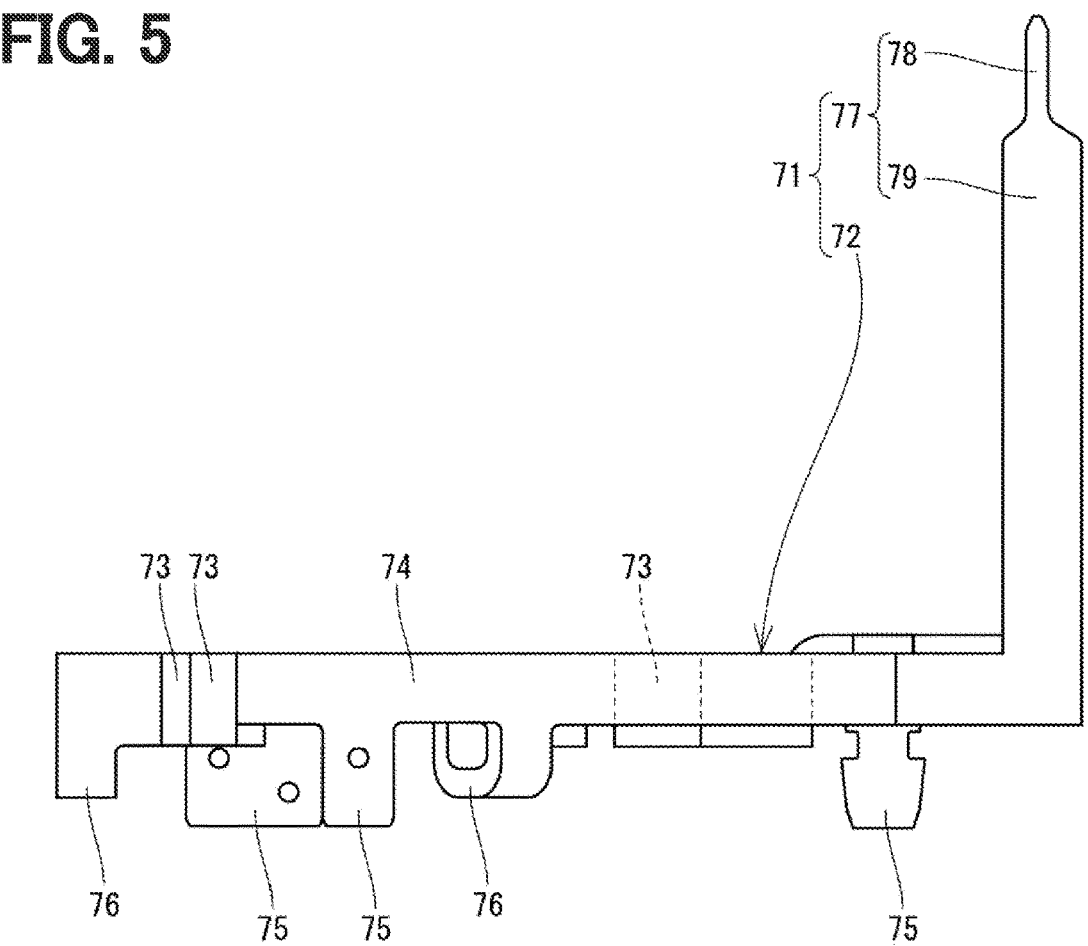
FIG. 5 is a side view of the bus bar terminal in FIG. 2, viewed from a direction of arrow V.
Figure 6:
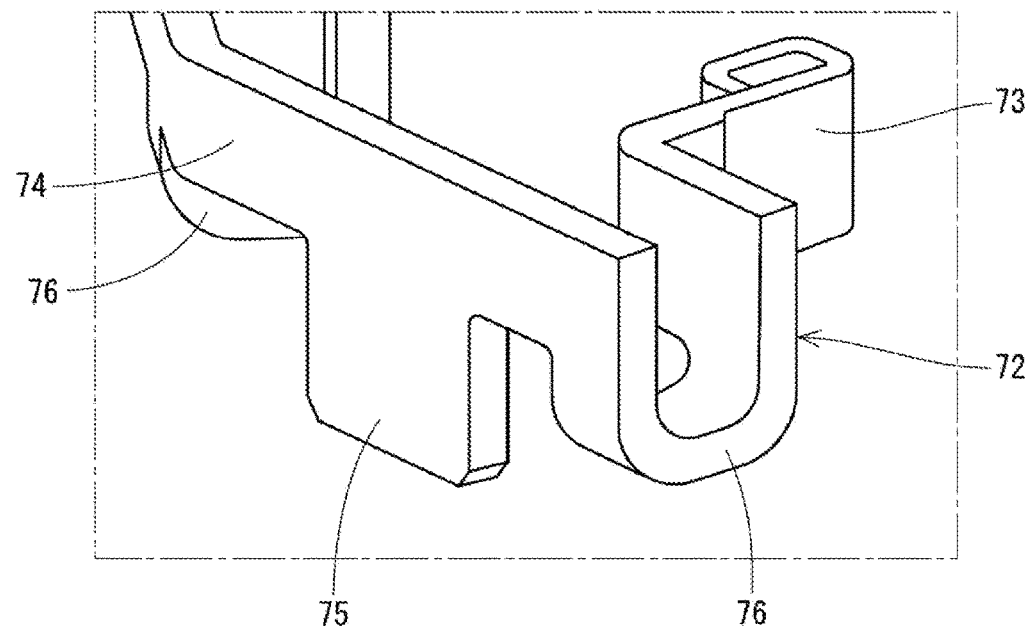
FIG. 6 is a perspective view of the bus bar terminal in FIG. 2, viewed from a direction of arrow VI.

An embodiment of a rotary electric machine will be described based on the drawings. As shown in FIG. 1, the motor 10 as a rotary electric machine is of a mechanical and electrical integrated type in which a rotating machine unit 20 and a control unit 50 are integrally provided. A bus bar unit 60 as a mechanical and electrical connection portion is provided between the rotating machine unit 20 and the control unit 50. The control unit 50 controls the rotating machine unit 20 to generate a desired torque based on information input from an external source and information such as motor current detected inside the control unit 50. The torque of the rotating machine unit 20 is output to the external source from an output end of a rotating shaft 32.

Hereinafter, a direction parallel to a rotation axis O of the rotating machine unit 20 will be referred to as an axial direction. Further, a direction perpendicular to the rotation axis O is referred to as a radial direction. Further, a direction around the rotation axis O is referred to as a circumferential direction.

The rotating machine unit 20 is a three-phase brushless motor, and includes a stator 21, a rotor 31, and a housing 41 accommodating the stator 21 and the rotor 31. The stator 21 includes a stator core 22 fixed to the housing 41 and a plurality of windings 23 assembled to a stator core 22. The stator core 22 has a plurality of teeth 24 extending radially. An insulator 25 with insulation properties is attached to each of the teeth 24. The windings 23 are wound around the insulators 25.

The rotor 31 includes a rotating shaft 32 supported by a rear bearing 45 and a front bearing 46, and a rotor core 33 fixed to the rotating shaft 32. The rotor 31 is provided inside the stator 21 and is rotatable relative to the stator 21. A permanent magnet 47 is provided at one end of the rotating shaft 32.

The housing 41 includes a cylindrical case 42, a rear frame end 43 provided at one end of the case 42, and a front frame end 44 provided at the other end of the case 42. The stator core 22 is fixed inside the case 42. The rear frame end 43 and the front frame end 44 are fastened to each other by bolts (not shown). The rear frame end 43 also functions as a heat sink for the control unit 50.

The control unit 50 includes a board 51 disposed on the rotation axis O and on the opposite side of the stator 21 with respect to the rear frame end 43, various electronic components mounted on the board 51, and a cover 55 arranged to cover the board 51 and various electronic components.

Although not shown, the various electronic components described above include, for example, a rotation angle sensor that detects the rotation angle of the rotating shaft 32, a motor drive element that performs a switching operation to switch an energization state of the plurality of windings 23, and a control circuit that performs calculations based on information from the external source, rotation angle sensors, etc. and issues commands to motor drive elements, etc.

As shown in FIGS. 1 to 6, the bus bar unit 60 includes a bus bar holder 61 provided on one side in the axial direction with respect to the stator 21 and between the stator 21 and the rear frame end 43 and a plurality of bus bar terminals 71 fixed to the bus bar holder 61 and electrically connected between the stator 21 and the control unit 50. In one embodiment, one bus bar terminal 71 is provided for each of the U phase, V phase, and W phase. That is, three bus bar terminals 71 are provided.

The bus bar holder 61 is made of an insulating material such as resin, and has a partition wall portion 62, a support portion 63, and a plurality of claw portions 64. The partition wall portion 62 is an annular portion continuously formed in the circumferential direction, and is provided between the stator 21 and the rear frame end 43. The support portions 63 protrude from the partition wall portion 62 in the other side in the axial direction and are in contact with the stator 21. The claw portions 64 protrude from the partition wall portion 62 in the other side in the axial direction and engage with the stator 21.

The partition wall portion 62 is provided between the stator 21 and the bus bar terminal 71. The bus bar terminal 71 includes a winding side terminal portion 72 having at least one connection part 73 and a board side terminal portion 77 connected to the board 51. In one embodiment, each bus bar terminal 71 is provided with two connection parts 73.

The connection part 73 is provided at a position where at least a part thereof overlaps the rotor 31 when viewed from the axial direction. The board side terminal portion 77 is provided on the outside in the radial direction with respect to the connection part 73. The two connection parts 73 provided in each winding side terminal portion 72 are gathered in a part in the circumferential direction, and are spaced apart from the connection part 73 of the other winding side terminal portions 72 in the circumferential direction.

In one embodiment, three board side terminal portions 77 corresponding to U-phase, V-phase, and W-phase are provided so as to be spaced apart from each other in the circumferential direction in that order. Regarding the V-phase bus bar terminal 71, the two connection parts 73 are provided in a relatively close area on the radially inner side with respect to the board side terminal portion 77 so as to be spaced apart from each other in the circumferential direction. Regarding the W-phase bus bar terminal 71, the two connection parts 73 are provided on the radially inner side with respect to the board side terminal portion 77 and in an area separated to one side in the circumferential direction so as to be arranged at intervals in the circumferential direction and side by side. Regarding the U-phase bus bar terminal 71, the two connection parts 73 are provided on the radially inner side with respect to the board side terminal portion 77 and in an area separated to the other side in the circumferential direction so as to be arranged at intervals in the circumferential direction and side by side.

Regarding the V-phase bus bar terminal 71, the winding side terminal portion 72 has two connection parts 73, an extension part 74 extending from the board side terminal portion 77 toward each connection part 73, and a press-fitting part 75 that is press-fitted into the press-fitted portion 65 of the bus bar holder 61. Regarding the U-phase and W-phase bus bar terminals 71, the winding side terminal portion 72 includes two connection parts 73, the extension part 74, the press-fitting part 75, and a bent part 76 connecting the extension part 74 and the connection part 73.

The plurality of windings 23 are provided all around the circumferential direction. A lead wire 82 is drawn out to the bus bar terminal 71 side in an axial direction from a lead-out portion 81 located on the bus bar terminal 71 side among the windings 23 and between a plurality of adjacent windings 23 in the circumferential direction. The plurality of lead-out portions 81 are scattered all around the circumferential direction. On the other hand, all the connection parts 73 are gathered in a part in the circumferential direction. In one embodiment, all the connection parts 73 are provided so as to be included in approximately half the circumference in the circumferential direction. The lead wires 82 are wired to extend from one of the plurality of lead-out portions 81 scattered all around the circumferential direction to one of the plurality of connection parts 73 gathered in a part of the circumferential direction. The bus bar terminal 71 is included in approximately half the circumference in the circumferential direction, and its overall length is relatively short.

The partition wall portion 62 has a through hole 66 formed to match each connection part 73. The lead wire 82 extends to the connection part 73 through the wiring space 67 between the partition wall portion 62 and the stator 21 and through the through hole 66. Two lead wires 82 are connected to each connection part 73.

The bus bar holder 61 has at least one protrusion 68 that protrudes in the axial direction toward a portion on a radially inner side of the insulator 25 (hereinafter referred to as an inner portion 26) in the wiring space 67. The gap between the protrusion 68 and the inner portion 26 is smaller than a wire diameter of the lead wire 82. In one embodiment, five protrusions 68 are provided circumferentially spaced apart.

Figure 7:
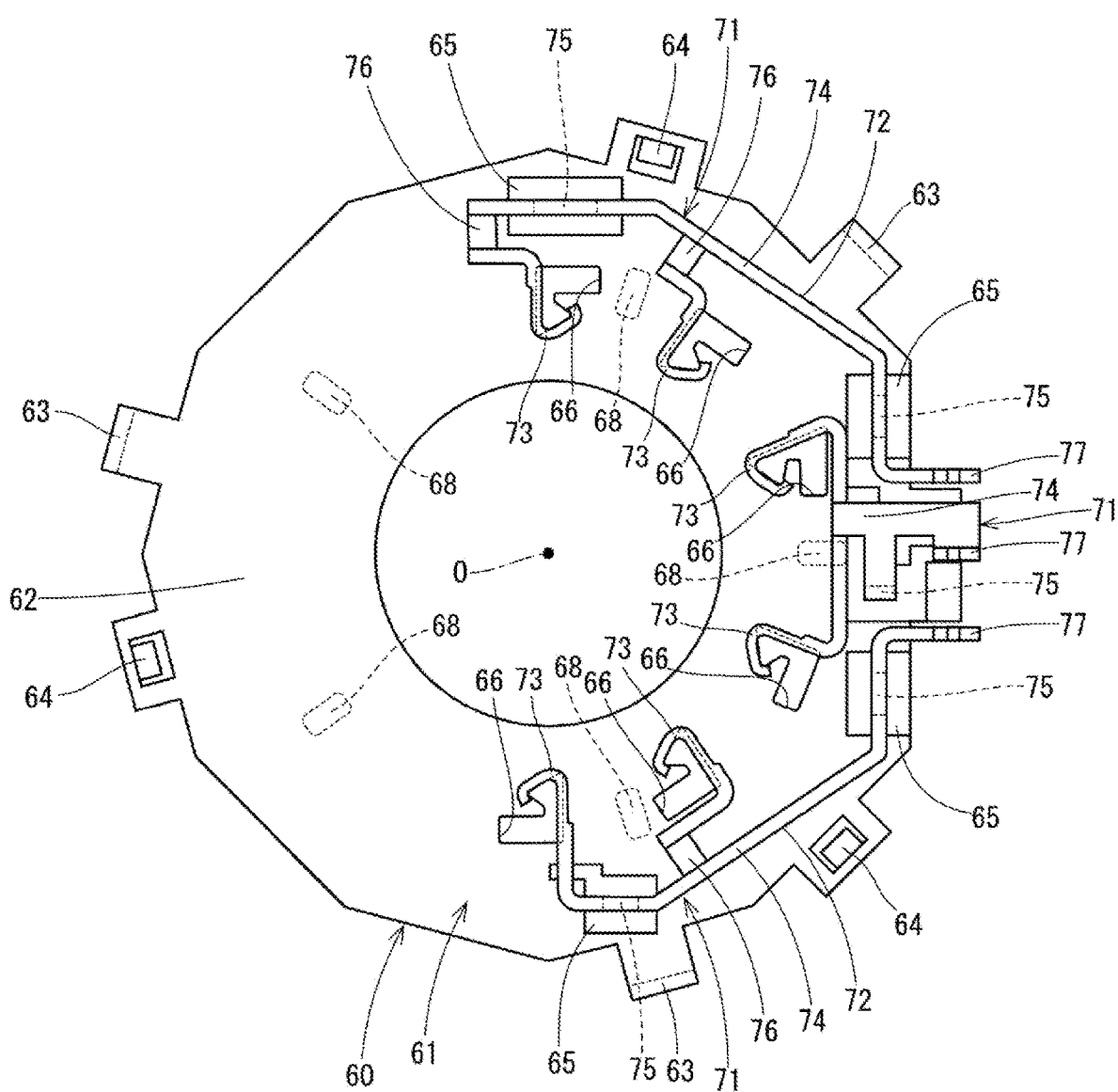
FIG. 7 is a diagram showing the bus bar unit of FIG. 2, and is a diagram showing the connection parts before crimping.

As shown in FIG. 7, the connection part 73 before connecting the lead wire 82 has a hook shape. The hook-shaped connection part 73 is connected to the lead wire 82 by being crimped while the lead wire 82 is hooked thereon. All the connection parts 73 before crimping are adapted to hook the lead wire 82 from one side in the circumferential direction.

As shown in FIGS. 1 to 6, the extension part 74 is provided a little apart from the partition wall portion 62 in the axial direction. The connection parts 73 are provided at the same axial position as at least a portion of the extension part 74. The press-fitted portion 65 is formed to protrude from the partition wall portion 62. The press-fitting part 75 is formed to protrude in the axial direction from the extension part 74 toward the partition wall portion 62 and is press-fitted into the press-fitted portion 65. The bent part 76 is formed so as to protrude in the axial direction from the extension part 74 toward the partition wall portion 62 and be bent in a U-shape toward an opposite side from the partition wall portion 62, and is connected to the connection part 73. The bent part 76 is provided at the same axial position as at least a portion of the press-fitting part 75.

The board side terminal portion 77 has a wide part 78 that extends in the axial direction from the winding side terminal portion 72 toward the board 51, and a narrow part 79 that projects from the wide part 78 into a connection hole 52 of the board 51. The wide part 78 has a larger cross-sectional area perpendicular to the axial direction than the narrow part 79.

(Effects)

As described above, in one embodiment, the lead wires 82 are wired to extend from one of the plurality of lead-out portions 81 scattered all around the circumferential direction to one of the plurality of connection parts 73 gathered in a part of the circumferential direction. As a result, it is sufficient to provide the bus bar terminal 71 only in a part of the circumferential direction, so the bus bar terminal 71 can be made shorter than in the conventional configuration in which the bus bar terminal 71 is continuously provided over substantially the entire circumferential direction. This configuration reduces the material costs of the bus bar terminal 71.

In one embodiment, the connection part 73 is provided at a position where at least a portion thereof overlaps with the rotor 31 when viewed from the axial direction. Therefore, the connection part 73 can be disposed by effectively utilizing a space on one side in the axial direction with respect to the rotor 31.

In one embodiment, the board side terminal portion 77 is provided on the outside in the radial direction with respect to the connection part 73. The plurality of connection parts 73 provided in each winding side terminal portion 72 are gathered in a part in the circumferential direction, and are spaced apart from the connection part 73 of the other winding side terminal portion 72 in the circumferential direction. Therefore, each winding side terminal portion 72 can be provided so as not to intersect with the other winding side terminal portion 72 when viewed from the axial direction. As a result, the axial height of the three winding side terminal portions 72 can be reduced compared to the comparative embodiment in which the plurality of winding side terminal portions are configured to intersect with each other when viewed from the axial direction.

In one embodiment, the bus bar holder 61 has at least one protrusion 68 that protrudes in the axial direction toward a portion on the radially inner side of the insulator 25 in the wiring space 67 where the lead wire 82 is wired. A gap between the protrusion 68 and the insulator 25 is smaller than the wire diameter of the lead wire 82. Thereby, when the lead wire 82 attempts to move toward the rotor 31, the protrusion 68 acts as a wall to prevent the lead wire 82 from moving. Therefore, when the motor 10 is operated, it is possible to prevent the lead wire 82 from getting caught up in the rotor 31.

In one embodiment, the connection parts 73 are provided at the same axial position as at least a portion of the extension parts 74. The bent part 76 is provided at the same axial position as at least a portion of the press-fitting part 75. As a result, the axial height of the winding side terminal portion 72 can be reduced compared to the case where the bent part 76 is provided at a different axial position from the press-fitting part 75.

In one embodiment, all the connection parts 73 before crimping are adapted to hook the lead wire 82 from one side in the circumferential direction. This configuration improves the ease of assembly when connecting the lead wire 82 to the connection part 73.

In one embodiment, the bus bar holder 61 includes the insulating partition wall portion 62 provided between the stator 21 and the bus bar terminal 71. This configuration ensures insulation.

In one embodiment, two or more lead wires 82 are connected to each connection part 73. Since the number of connections between the connecting part 73 and the lead wire 82 is reduced, the number of manufacturing steps can be reduced.

Here, a certain problem regarding the bus bar terminal 71 that connects the rotating machine unit 20 and the control unit 50 will be explained. Since a large current flows through the bus bar terminal 71 compared to the signal lines in the control unit 50, the amount of heat generated is large. Therefore, it is common to make the bus bar terminal 71 thicker in order to lower the electrical resistance. However, when the bus bar terminal 71 and the board 51 of the control unit 50 are joined by soldering, there is a problem in that increasing the thickness of the bus bar terminal 71 increases the area for soldering, thereby increasing the difficulty of soldering. Therefore, there is a need to suppress heat generation while reducing the difficulty of soldering the bus bar terminals 71.

In this respect, in one embodiment, the board side terminal portion 77 has a wide part 78 that extends in the axial direction from the winding side terminal portion 72 toward the board 51, and a narrow part 79 that projects from the wide part 78 into a connection hole 52 of the board 51. The wide part 78 has a larger cross-sectional area perpendicular to the axial direction than the narrow part 79. As a result, by soldering the relatively thin narrow part 79 to the board 51, the difficulty of soldering can be reduced, and by arranging the wide part 78, which has a relatively large cross-sectional area, next to the narrow part 79, self-heating can be suppressed by lowering electrical resistance.

OTHER EMBODIMENTS

In other embodiments, the number of bus bar terminals is not limited to three. The number of windings is not limited to one system, but may be two or more systems. The method of connecting the lead wire and the connection part is not limited to crimping, but may be other methods such as welding.

In other embodiments, the bus bar holder may be fixed to a member other than the stator. The method of fixing the bus bar holder is not limited to engagement using claws, but may be other methods using screws or the like, for example. The partition wall portion of the bus bar holder is not limited to an annular shape, and may be formed in a portion in the circumferential direction.

In other embodiments, the control unit is not limited to being provided on one side in the axial direction with respect to the rotating machine unit, but may be provided on the outside in the radial direction with respect to the rotating machine unit, for example. Corresponding to this configuration, the board side terminal portion may be formed to extend in a direction other than the axial direction.

The present disclosure is not limited to the embodiments described above, and various modifications are possible within the scope of the present disclosure without departing from the spirit of the invention.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A rotary electric machine, comprising:
   a stator;
   a rotor configured to be rotatable relative to the stator;
   a control unit connected to the stator;
   a bus bar holder provided on one side of the stator in an axial direction; and
   a plurality of bus bar terminals fixed to the bus bar holder and electrically connecting the stator and the control unit, wherein
   the stator has a plurality of windings provided all around a circumferential direction,
   a lead wire is drawn out to the bus bar terminal side in the axial direction from a lead-out portion located on the bus bar terminal side among the windings and between a plurality of adjacent windings in the circumferential direction,
   the bus bar terminal includes a winding side terminal portion having at least one connection part and a board side terminal portion connected to a board of the control unit,
   a plurality of bus bar terminals are gathered in a part in the circumferential direction, and
   the lead wire is wired so as to extend from one of the plurality of lead-out portions scattered all around the circumferential direction to one of the plurality of connection parts.

2. The rotary electric machine according to claim 1, wherein
   the connection part is provided at a position where at least a part thereof overlaps the rotor when viewed from the axial direction,
   the board side terminal portion is provided on an outside in a radial direction with respect to the connection part, and
   the plurality of connection parts provided in each winding side terminal portion are gathered in a part in the circumferential direction, and are spaced apart from the connection part of the other winding side terminal portion in the circumferential direction.

3. The rotary electric machine according to claim 1, wherein
   the bus bar holder has at least one protrusion that protrudes in the axial direction toward a portion on a radially inner side of an insulator of the stator in a wiring space where the lead wire is wired, and
   a gap between the protrusion and the insulator is smaller than a wire diameter of the lead wire.

4. The rotary electric machine according to claim 1, wherein
   the winding side terminal portion includes a connection part, an extension part extending from the board side terminal portion toward the connection part, and a press-fitting part press-fitted into the bus bar holder, and a bent part connecting the extension part and the connection part,
   the connection part is provided at the same axial position as at least a portion of the extension part, and
   the bent part is provided at the same axial position as at least a portion of the press-fitting part.

5. The rotary electric machine according to claim 1, wherein
   the connection part before connecting the lead wire has a hook shape,
   the hook-shaped connection part is connected to the lead wire by being crimped while the lead wire is hooked thereon, and
   all of the connection parts before crimping are configured to hook the lead wire from one side in the circumferential direction.

6. The rotary electric machine according to claim 1, wherein
   the bus bar holder has an insulating partition wall portion provided between the stator and the bus bar terminal.

7. The rotary electric machine according to claim 1, wherein
   two or more of the lead wires are connected to each of the connection parts.

8. The rotary electric machine according to claim 1, wherein
   the board side terminal portion has a wide part that extends in the axial direction from the winding side terminal portion toward the board, and a narrow part that projects from the wide part into a connection hole of the board, and
   the wide part has a larger cross-sectional area perpendicular to the axial direction than the narrow part.

* * * * *